United States Patent [19]
Richman et al.

[11] Patent Number: 4,809,302
[45] Date of Patent: Feb. 28, 1989

[54] CLOCK INJECTOR CIRCUIT

[75] Inventors: Jay L. Richman, Montville; Adrian Chan, Harrington Park, both of N.J.

[73] Assignee: Allied-Signal Inc., Morris Township, Morris County, N.J.

[21] Appl. No.: 55,572

[22] Filed: May 29, 1987

[51] Int. Cl.[4] .............................................. H04C 7/00
[52] U.S. Cl. ................................... 375/107; 375/111; 375/118; 370/100
[58] Field of Search ............... 375/106, 107, 111, 118, 375/119, 7, 8, 9; 370/100

[56] References Cited
U.S. PATENT DOCUMENTS 3,995,119  11/1976  Pachynski, Jr. .................... 370/100
4,683,578  7/1987   Betts et al. ...................... 375/118 X Primary Examiner—A. D. Pellinen
Assistant Examiner—Derek S. Jennings
Attorney, Agent, or Firm—Howard G. Massung

[57] ABSTRACT

An interface circuit is used to permit a data multiplexing circuit to receive data from two channels which are asynchronously clocked. The data from the two channels is received by the interface circuit and transferred to the multiplexing circuit in a manner determined by clock signals.

8 Claims, 3 Drawing Sheets

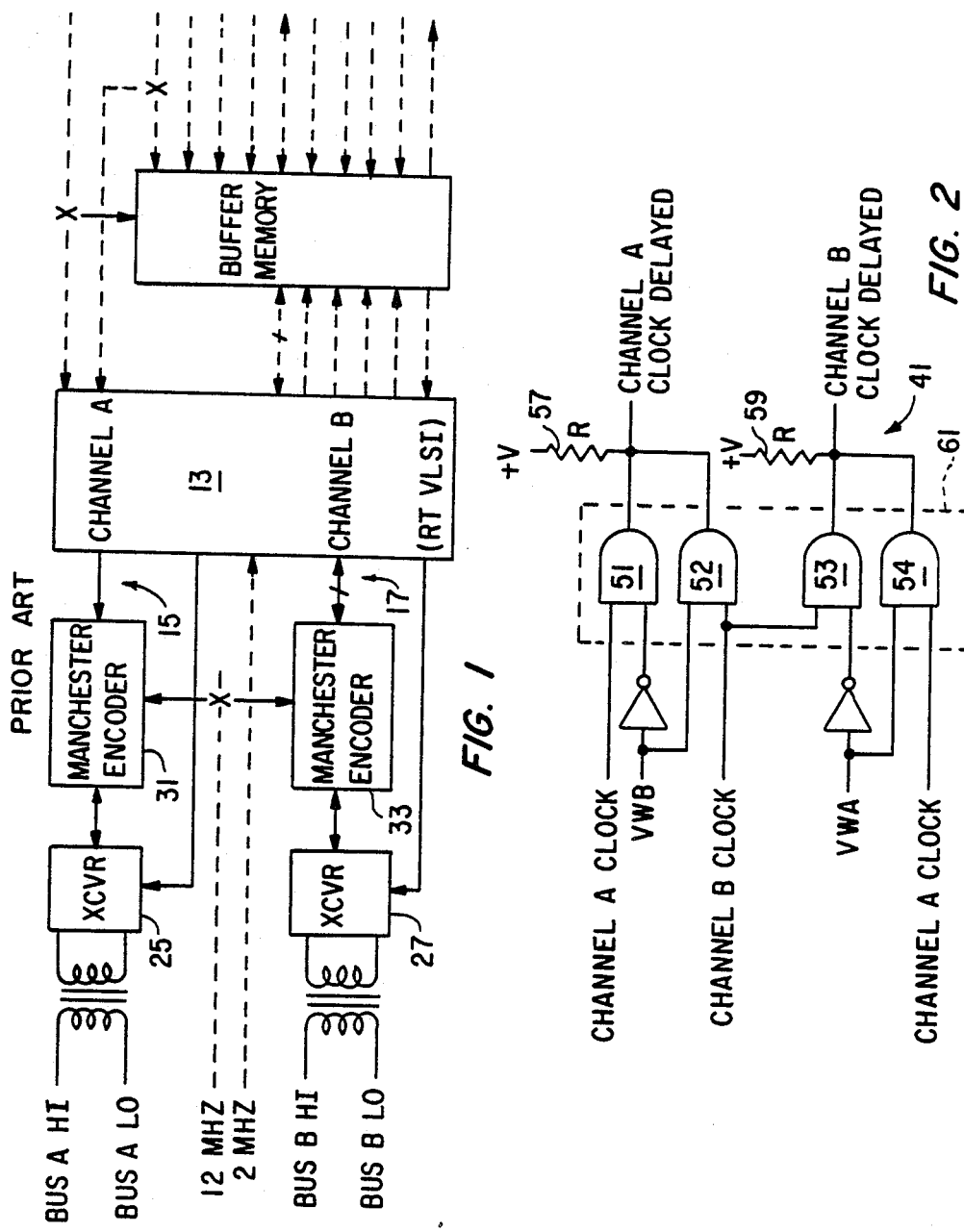

CLOCK INJECTOR CIRCUIT

FIELD OF THE INVENTION

This invention relates to time sequenced electronic circuitry such as digital logic circuitry. The invention has particular application for circuits such as Very Large Scale Integrated (VLSI) circuits which must process multiple signals which are not synchronized with one another. In a more general sense, this invention relates to techniques for modifying existing circuitry architecture without modifying the circuit itself.

BACKGROUND OF THE INVENTION

With the advent of very large scale integrated (VLSI) circuits, new levels of performance have been achieved and new types of problems have arisen. One of the most pressing concerns is design modification. If the testing of a new VLSI device reveals a performance deficit, the conventional remedy is a redesign of the device. However, successive iterations of a VLSI device incur significant cost and time liabilities. Clearly, a method of altering performance by the addition of a small, efficient external circuit would be highly preferable.

Consider the typical avionics system shown in FIG. 1. In one specific mode of operation, remote terminal VLSI (RT VLSI) device 13, after servicing Bus A 15, is commanded to service Bus B 17. The logic internal to the RT VLSI 13 device creates an "enable channel" request pulse whose duration is nearly equal to the period of a clock sampling the pulse. This often occurs in systems where a response to given stimuli must take place within a limited time. For "enable Channel A" pulses, a Channel A clock is used to sample and for "enable Channel B" pulses, a Channel B clock is used. Therefore, for successive Channel A or for successive Channel B operations, the respective pulses and clocks are synchronous. For the cases where it is desired to switch channels from A to B or B to A, the "enable channel" pulse must be latched by the clock of the presently served channel. Since the Channel A and Channel B clocks may be inherently asynchronous, it is statistically possible for the rising edges of the clock to occur close to the rising and falling edges of the "enable channel" pulse generated by the other channel. When this happens, a "set-up" or "hold" time violation of the internal logic can cause the pulse to be "missed" and the requesting channel will not be served.

Accordingly, it is desired to modify the architecture embodied in an existing circuit without changing the circuit itself. It is further desired to improve the ability of a circuit to communicate with two different communication sources in which data from the two communication sources may not be synchronous with respect to one another. It is further desired to provide data transfer and enable functions between a single circuit and two disparate data communication lines.

SUMMARY OF THE INVENTION

Since the faulty operation results from a difference in the phase between two clocks, the invention "forces" the internal logic to "see" the clock edge it needs to successfully switch channels. In one aspect of this invention, signals present at the time channel switching occurs are employed to multiplex Channel A and Channel B clocks. When a signal from a first channel is present, implying selection of Channel A, the Channel B clock is "forced" to assume the same phase as the Channel A clock. Injection of an identically phased clock ensures that the "enable channel" request will be captured and serviced since the timing relationships are the same as those for successive servicing on one channel.

Another aspect of the invention employs a synchronous approach using oth a signal present at the time of the "enable channel" request and a master clock. A short pulse is generated (one cycle of the master clock) which causes the clock on each channel to reverse phase for the duration of that pulse. After the pulse, the clocks revert to their previous phases. This double phase reversal also ensures injection of the correct clock edge or transition needed to capture and service an ⇌enable channel" request.

BRIEF DESCRIPTION OF THE DRAWINGS

FIG. 1 is a schematic block diagram showing a prior art system in which two communication buses are connected to a single signal processor;

FIG. 2 shows a clock injector circuit constructed in accordance with one embodiment of the invention;

DETAILED DESCRIPTION OF THE PREFERRED EMBODIMENTS

Figure 3:
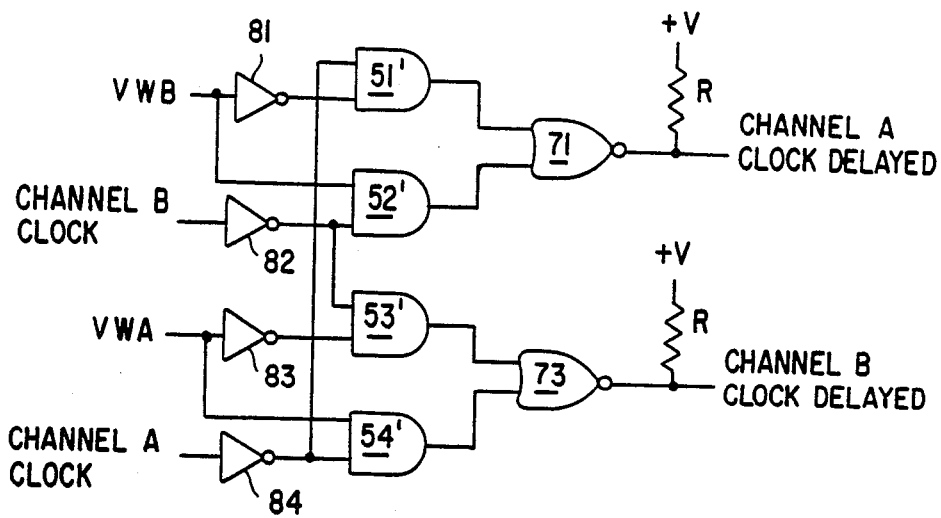
FIG. 3 shows a clock injector circuit constructed in accordance with a second embodiment of the invention.

FIG. 1 shows a typical prior art system, in which a pair of data buses A,B are connected to a system through a serial communication and memory processing circuit 13, sometimes referred to as a RT VLSI circuit (remote terminal very large scale integrated circuit). Information on each bus is transferred through bus transceivers 25, 27, with Manchester decoder/encoders 31, 33 translating the information from Manchester encoded data in a format acceptable for transmittal to the data buses A, B and which appear at the transceivers 25, 27. This Manchester encoded data is translated by the Manchester encoders 31, 33 to and from nonreturn to 0 data, acceptable to the RT VLSI 13.

In order to avoid ambiguities in the transmission of data from buses A and B to the RT VLSI, the present invention provides an interface circuit which modifies the input to the RT VLSI and is inserted in place of input connections 15, 17. Referring to FIG. 2, one type of interface circuit 41 uses AND logic. Clock signals from channels A and B are provided to AND gates 51-54, and control signals are provided to the AND gates 51-54 in inverted and non-inverted form. The Channel A clock is provided to one AND gate 51 with an inverted signal from bus B. The Channel A clock is also provided to AND gate 54 with the non-inverted signal from bus A. The Channel B clock is matched with the non-inverted signal from bus B at AND gate 52 and with the inverted signal from bus A at AND gate 53. The outputs from AND gates 51 and 52 represent a delayed version of the Channel A clock and is provided as a clock signal for Channel A to the RT VLSI 13. The outputs of AND gates 53 and 54 provide a Channel B clock signal to RT VLSI 13. Resistors 57, 59 are used to match the bipolar circuitry of the AND gates with a complementary oxide semiconductor (CMOS) device which may be used as the RT VLSI 13. The AND gates 51-54 may be found on integrated circuit SN 54S09, available from National Semiconductor, shown as 61.

FIG. 3 shows an AND-OR-INVERT circuit which can be used in place of the circuit of FIG. 2. The circuit of FIG. 2 uses open collector devices, and the circuit of FIG. 3 uses separate gating elements 71,73 to achieve combinational logic.

In FIG. 3, the Channel A and Channel B clocks and signals are inverted and provided to AND gates 51'-54' in a manner similar to the signals provided to AND gates 51-54 in FIG. 2. The outputs of AND gates 51'-54' are provided to inverting OR (NOR) gates 71, 73. The outputs of these NOR gates 71, 73 are provided as clock signals to the RT VLSI 13. These gates, including inverters 81-84 used for inverting the clock and control signals, may be part of integrated circuit PAL 16R6A, available from Harris Semiconductor. This chip is a programmable array logic (PAL) device and is believed to simplify the implementation of this invention.

Figure 4:
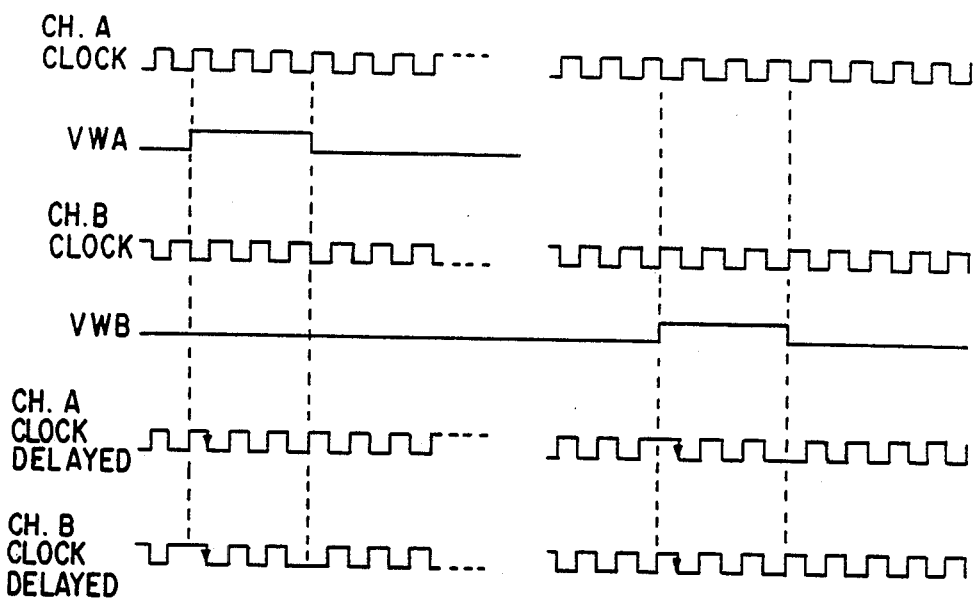
FIG. 4 is a timing diagram showing the timing sequence of the circuits of FIGS. 2 and 3.

Refering to FIG. 4, whenever a data bit is received from one of the data buses, the AND gates 51-54 or 51-54 will delay the clock signals from the clocks until the clock signals are synchronized with the receipt of the data bit. As a practical matter, signal from the data bus associated with that data bit is relatively unaffected. This delay is maintained, usually over several clock cycles, for the duration of the data bit.

Figure 5:
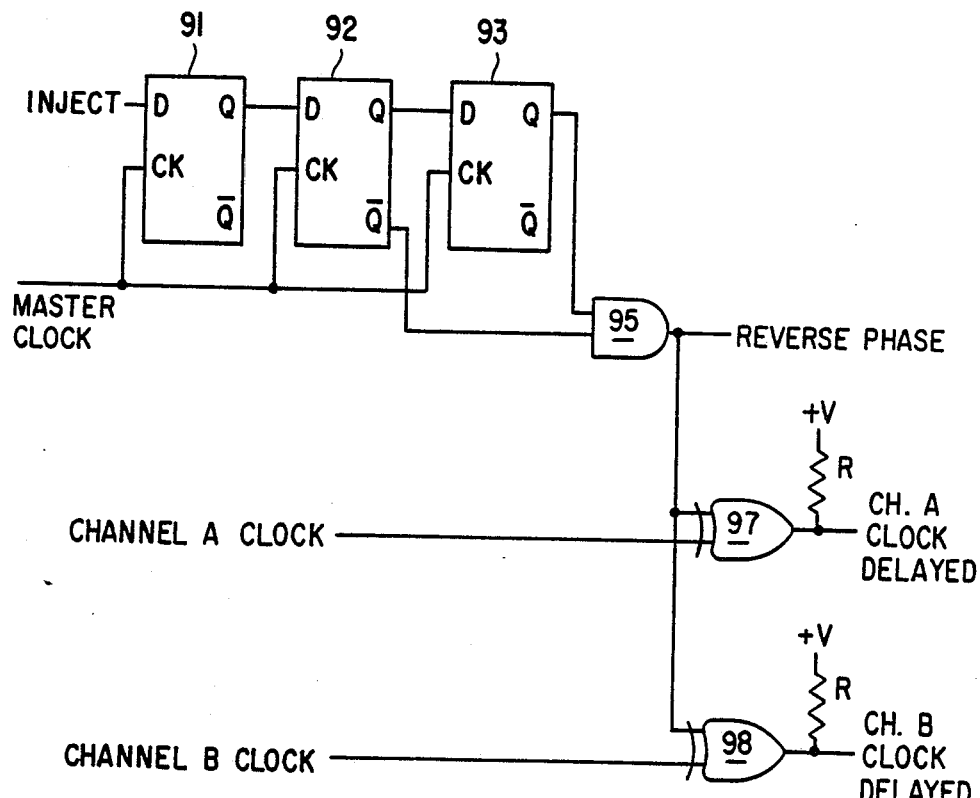
FIG. 5 shows another embodiment of the invention, in which a master clock is used.

FIG. 5 shows a synchronous approach, for systems in which a master clock signal is available. In this system, an inject signal present at the time of the "enable channel" signal causes a clock signal from each bus to reverse phase for a period equal to the duration of the master clock pulse. A series of D flip flops 91-93 receives the "enable channel" signal as an inject signal, and receives a master clock signal. After a minimum time of one cycle of the master clock, a negative going inject signal causes the flip flop 92 Q bar output to go to a logic "one" state at the rising edge of the master clock. Until the next rising edge of the master clock, the flip flop 92 Q bar output and the flip flop 93 Q bar output are both a logic "one" and being applied to the inputs of AND gate 95, cause the "reverse phase" signal is applied as a logic "one" to one input of each of the two EXCLUSIVE OR gates 97, 95. When the "reverse phase" signal is a logic "zero", the output of each EXCLUSIVE OR gate 97, 98 is the Channel A or Channel B clock without inversion. When the "reverse phase" signal is a logic "one", the output of each EXCLUSIVE OR gate is the Channel A or Channel B clock inverted. Therefore, the channel clocks reverse phase when the "reverse phase" becomes a logic "one" and revert to their previous phases when it becomes a logic "zero". This creates a double phase reversal which also ensures injection of a correct clock edge or transition needed to capture and service each "enable channel" request.

Figure 6:
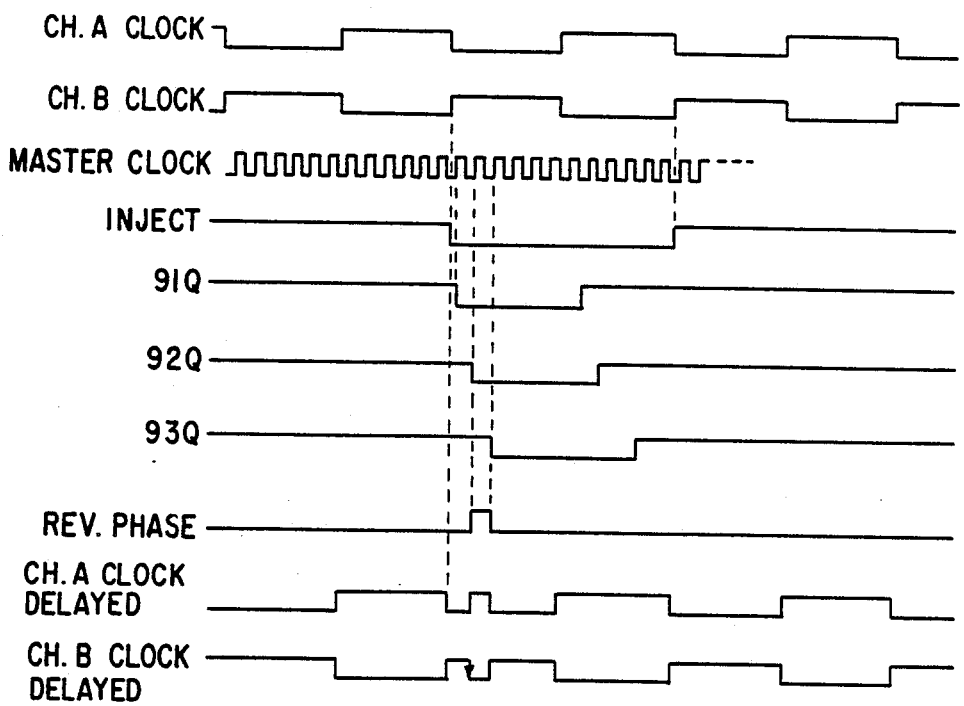
FIG. 6 is an imaging diagram showing the timing sequence of the circuit of FIG. 5.

Referring to FIG. 6, the master clock preferrably has a clock rate which is greater than that of either the Channel A or Channel B clocks. This is shown on the first three curves of FIG. 6. In the preferred embodiment, the master clock rate is at least twice that of either Channel A or Channel B. Whenever an "inject" signal is received, the flip flops 91-93 and EX OR gates 97,98 provide a pulse which is substantially shorter in duration than the duration of the clock signals. This pulse, shown in FIG. 6 as "Rev. Phase", is the result of ANDing the Q and $\bar{Q}$ outputs of flip flops 92 and 93. The delayed clock signals then are caused to be modified in accordance with the outputs of the AND gate 95, as shown on the bottom two curves of FIG. 6.

We claim:

1. Circuitry for receiving signals from at least two data busses representing distinct channels, in which each data bus provides a data stream which may be at any given time by a phase shift asynchronous with respect to that provided by the other data bus, and in which the circuitry includes a circuit for receiving the data and a circuit further responsive to the data, further characterized by:
   (a) an interface circuit connected to the two busses for receiving the data from the two busses, and receiving clock signals from each of said channels, the clock signals representing timing of the data on their respective busses; and
   (b) the interface circuit including means to transmit the data from the two busses to said circuit further responsive to the data, the means to transmit delaying said transmission for a time period approximating that of a time period represented by said phase shift.

2. Circuitry as described in claim 1, further characterized by:
   the means to transmit sensing the presence of data on each of the data busses and delaying transmission of the data from one of the busses until the clock signal from the other bus has changed.

3. Circuitry as described in claim 2, further characterized by:
   (a) the interface circuit including a pair of AND gates for one of the channels, with one AND gate being connected to an output of that channel's data bus and the other AND gate being connected to an inverted ouput of that channel's data bus, the AND gates providing their outputs to said circuit further responsive to the data as one output channel, and one of the AND gates being connected to receive the clock signals from that channel and the other one of the AND gates being connected to receive the clock signals from the other channel; and
   (b) the interface circuit including a second pair of AND gates for the other channel connected to an output and an inverted output of the other channel's data bus and one AND gate being connected to receive the clock signals from that channel and the other AND gate being connected to receive the clock signals from the other channel, and the AND gates providing their outputs to said circuit further responsive to the data as a second channel output.

4. Circuitry as described in claim 1, further characterized by:
   (a) a means for providing a master clock signal which includes a series of clock pulses
   (b) said means to transmit the data includes means to delay for sensing the presence of data on at least one of the data busses; and
   (c) said means to delay causing a reversed phase of the clock signals from one of the channels whenever the data is present on that channel and a clock pulse from said means for providing a master clock signal is sensed.

5. Circuitry as described in claim 4, further characterized by:

said reversal of phase being maintained for a duration approximately equal to that of the sensed clock pulse from the master clock.

6. Circuitry as described in claim 1, further characterized by:
 (a) a master clock providing a signal which includes a series of clock pulses
 (b) said means to transmit the data includes means to delay for sensing the presence of data on each of the data busses; and
 (c) said means to delay causing a reversed phase of the clock signals from at least one of the channels whenever the data is present on that channel and a clock pulse from said master clock is sensed, and reversing phase of the clock signals a second time when clock signals from both channels are present.

7. Circuitry for receiving signals from at least two data busses representing distinct channels, in which each data bus provides a data stream which may be at any given time by a phase shift asynchronous with respect to that provided by the other data bus, and in which the circuitry includes a circuit for receiving the data and a circuit further responsive to the data, further characterized by:
 (a) an interface circuit connected to the two busses for receiving the data from the two busses, and receiving clock signals at bus clock signal rates from each of said channels, the clock signals representing timing of the data on their respective busses;
 (b) a master clock having a clock rate which is greater than the bus clock signal rates; and
 (c) the interface circuit including means to transmit the data from the two busses to said circuit further responsive to the data, the means to transmit synchronizing the data from said busses with the master clock, and further establishing a timing interval such that a reverse phase signal is generated, whereby signal changes in the data stream results in a reverse phase pulse which is shorter in duration than half of each of the clock preiods defined by the bus clock signal rates.

8. Circuitry as defined in claim 7 further characterized by the interface circuitry including:
 (a) a first flip flop circuit which responds to said master clock and the data provided by the data busses to synchronize the data provided by the data busses with said master clock;
 (b) further flip flop circuitry, receiving the data synchronized by the first flip flop circuit, for establishing time intervals during which reverse signals are to be established in response to the synchronized data; and
 (c) means to provide output clock signals corresponding to the clock signals from each of the channels, delayed by said established time intervals.

* * * * *